United States Patent
Balson et al.

(10) Patent No.: US 7,170,212 B2
(45) Date of Patent: Jan. 30, 2007

(54) SYNCHRONOUS AXIAL FIELD ELECTRICAL MACHINE

(75) Inventors: John Charles Balson, Nottingham (GB); David Irving, Plymouth (GB); Robert James Cann, Nottingham (GB); Michael Andrew Wastling, Leicester (GB)

(73) Assignee: Iska Wind Turbines Ltd (GB)

( * ) Notice: Subject to any disclaimer, the term of this patent is extended or adjusted under 35 U.S.C. 154(b) by 0 days.

(21) Appl. No.: 10/495,469

(22) PCT Filed: Dec. 2, 2002

(86) PCT No.: PCT/GB02/05453

§ 371 (c)(1),
(2), (4) Date: Sep. 27, 2004

(87) PCT Pub. No.: WO03/049260

PCT Pub. Date: Jun. 12, 2003

(65) Prior Publication Data

US 2005/0029899 A1    Feb. 10, 2005

(30) Foreign Application Priority Data

Dec. 1, 2001   (GB) .................................. 0128854.7

(51) Int. Cl.
*H02K 3/26*    (2006.01)
*H02K 29/00*   (2006.01)
*H02K 21/24*   (2006.01)

(52) U.S. Cl. ............. 310/268; 310/156.32; 310/156.36; 310/254

(58) Field of Classification Search ................. 310/254, 310/268, DIG. 6, 156.36, 156.37
See application file for complete search history.

(56) References Cited

U.S. PATENT DOCUMENTS 4,429,240 A * 1/1984 Kishi ......................... 310/45
4,733,115 A * 3/1988 Barone et al. ............ 310/68 R (Continued)

FOREIGN PATENT DOCUMENTS

WO    WO0106623    6/2000

(Continued)

OTHER PUBLICATIONS

International Search Report Jun. 30, 2003.

*Primary Examiner*—Burton Mullins
(74) *Attorney, Agent, or Firm*—Ira S. Dorman

(57) ABSTRACT

A permanent magnet electrical machine comprises a first substantially planar member (9, 10) and a second substantially planar member (3) arranged substantially parallel to the first substantially planar member. The first and second members are rotatable relative to each other about a common axis substantially perpendicular to the planes of the first and second members. The first member (9, 10) is provided with an annular array of permanent magnets (7, 8) coaxial with the common axis and configured to provide a substantially axial magnetic field passing through the second member. The second member (3) is provided with a first annular array of flat coils (1) coaxial with the common axis and arranged substantially side-by-side in a first layer and with a second annular array of flat coils (2) coaxial with the common axis and arranged substantially side-by-side in a second layer. The coils (2) of the second array are offset in a circumferential direction relative to the coils (1) of the first array.

11 Claims, 7 Drawing Sheets

U.S. PATENT DOCUMENTS

| | | | |
|---|---|---|---|
| RE33,628 E * | 7/1991 | Hahn | 310/268 |
| 6,037,692 A * | 3/2000 | Miekka et al. | 310/198 |
| 6,046,518 A * | 4/2000 | Williams | 310/43 |
| 6,153,959 A * | 11/2000 | Lorenzo | 310/162 |
| 6,163,097 A * | 12/2000 | Smith et al. | 310/261 |
| 6,404,097 B1 * | 6/2002 | Pullen | 310/268 |
| 6,720,688 B1 * | 4/2004 | Schiller | 310/64 |

FOREIGN PATENT DOCUMENTS

WO      WO0038297      1/2001

\* cited by examiner

SYNCHRONOUS AXIAL FIELD ELECTRICAL MACHINE

This invention relates to a synchronous axial field electrical machine. For example, the machine may be a permanent magnet machine or an electromagnet machine and may be either a generator or a motor.

Synchronous axial field electrical machines are well known, for example in the form of generators, in which magnets are moved relative to electrical conductors in order to convert motion into electrical power.

Many different configurations are possible for synchronous axial field electrical machines, the magnets generally being moved relative to stationary conductor coils. The magnets are generally attached to a rotating shaft, the rotating assembly being known as a rotor assembly. The stationary arrangement of conductor coils is known as a stator assembly.

In a typical arrangement for a synchronous axial field electrical machine, the magnets, often in the form of permanent magnets, are arranged radially in an annular array on a pair of parallel soft magnetic steel discs or plates with adjacent magnets on each plate alternating in their polarity. Two discs are then mounted for rotation about a common axis with an air gap between the two discs such that magnets on one disc are directly aligned with magnets of opposite polarity on the other disc. The magnetic flux passes through the air gap between opposing magnets and completes magnetic circuits by travelling through the discs to adjacent magnets and then through adjacent air gaps.

By soft magnetic material there is meant herein a material which is magnetisable in a magnetic field, but is not permanently magnetisable.

The stationary conductor coils are flat and are arranged in the air gap between the two discs in an annular array. Rotation of the discs causes a fluctuating magnetic field to pass through the conductors and generates an electrical current. In practice the stator employs conductor coils having a width similar to the spacing between adjacent magnets. The effect of this is that each side of a coil will experience a magnetic field in the opposite direction, causing current to flow in a radially outwards direction on one side of the coil and in a radially inwards direction on the other side of the coil. Therefore, at any point in time, the current will be driven either clockwise or anti-clockwise around the coil. This is common practice in synchronous axial field generators.

In order to minimise eddy current losses in the rotor discs it is desirable to maximise the number of coils in the stator for each magnet pair provided in the rotor. If the coils are simply placed side-by-side, this imposes a limit on the number of coils that can be provided since the coil width should be similar to the magnet spacing. A solution to this problem is to overlap the coils around the stator so that the left-hand side of one coil is on top of, or beneath, the right-hand side of an adjacent coil. However, such an arrangement has a number of disadvantages in that it is complicated to manufacture and the coils can be difficult to cool due to the need to support the coils of the external faces of the stator.

Clearly, such an electrical machine can be either a generator or a motor and the magnets can be provided either on the rotor or on the stator.

Such an electrical machine, in the form of a motor, is known from U.S. Pat. No. 4,551,645 which illustrates a number of coil configurations.

It is therefore an object of the present invention to provide a synchronous axial field electrical machine which overcomes or at least ameliorates the abovementioned disadvantages.

According to the present invention there is provided a synchronous axial field electrical machine comprising a first substantially planar member and a second substantially planar member arranged substantially parallel to the first substantially planar member, the first and second members being rotatable relative to each other about a common axis substantially perpendicular to the planes of the first and second members, wherein the first member is provided with an annular array of magnets coaxial with the common axis and configured to provide a substantially axial magnetic field passing through the second member and wherein the second member is provided with a first annular array of flat coils coaxial with the common axis and arranged substantially side-by-side in a first layer and with a second annular array of flat coils coaxial with the common axis and arranged substantially side-by-side in a second layer, the coils of the second array being offset in a circumferential direction relative to the coils of the first array.

The magnets may comprise permanent magnets and/or electromagnets.

The first planar member may comprise a rotor assembly and the second planar member may comprise a stator assembly.

The first planar member may be formed of a single component. That is, the first planar member may not be laminated.

The first planar member may be formed of a soft magnetic material, for example a steel, such as mild steel.

The magnets and the coils may be disposed at substantially the same radial distance from the common axis.

The first planar member may comprise first and second coaxial plates which are spaced apart from each other. The magnets may be provided on that face of each one of the first and second plates facing the other thereof. The first and second plates may be secured together around the peripheral regions thereof. The second member may be arranged in an air gap between the first and second plates.

The first and second arrays of flat coils may be provided on opposing sides of a support member. The support member may be made of a non-magnetic, non-electrically-conducting material, such as glass fibre reinforced plastics material. The support member may be annular and may be connected to a shaft by way of spokes. Alternatively, the support member may be connected to a shaft and may be provided with apertures for the passage of cooling air.

The coils may be embedded in a resin material, such as an epoxy resin.

One or more further layers of coils may be provided.

The coils of each layer may be offset by an amount corresponding substantially to the pitch of adjacent coils divided by the number of layers. For example, two layers of coils may be provided, the coils of one layer being offset relative to the coils of the other layer by an amount corresponding substantially to half the pitch of adjacent coils.

The synchronous axial field electrical machine may be in the form of a generator or a motor.

For a better understanding of the present invention and to show more clearly how it may be carried into effect reference will now be made, by way of example, to the accompanying drawings in which.

FIGS. 1 to 5 show a synchronous axial field electrical machine in the form of a permanent magnet electrical machine and configured as a generator with permanent magnets provided on a rotor assembly. However, it will be appreciated the machine can readily be modified in a number of ways. For example the machine can readily function as a motor and the permanent magnets can readily be provided on a stator assembly. It will further be appreciated the permanent magnets can readily be replaced by electromagnets.

Figure 1:
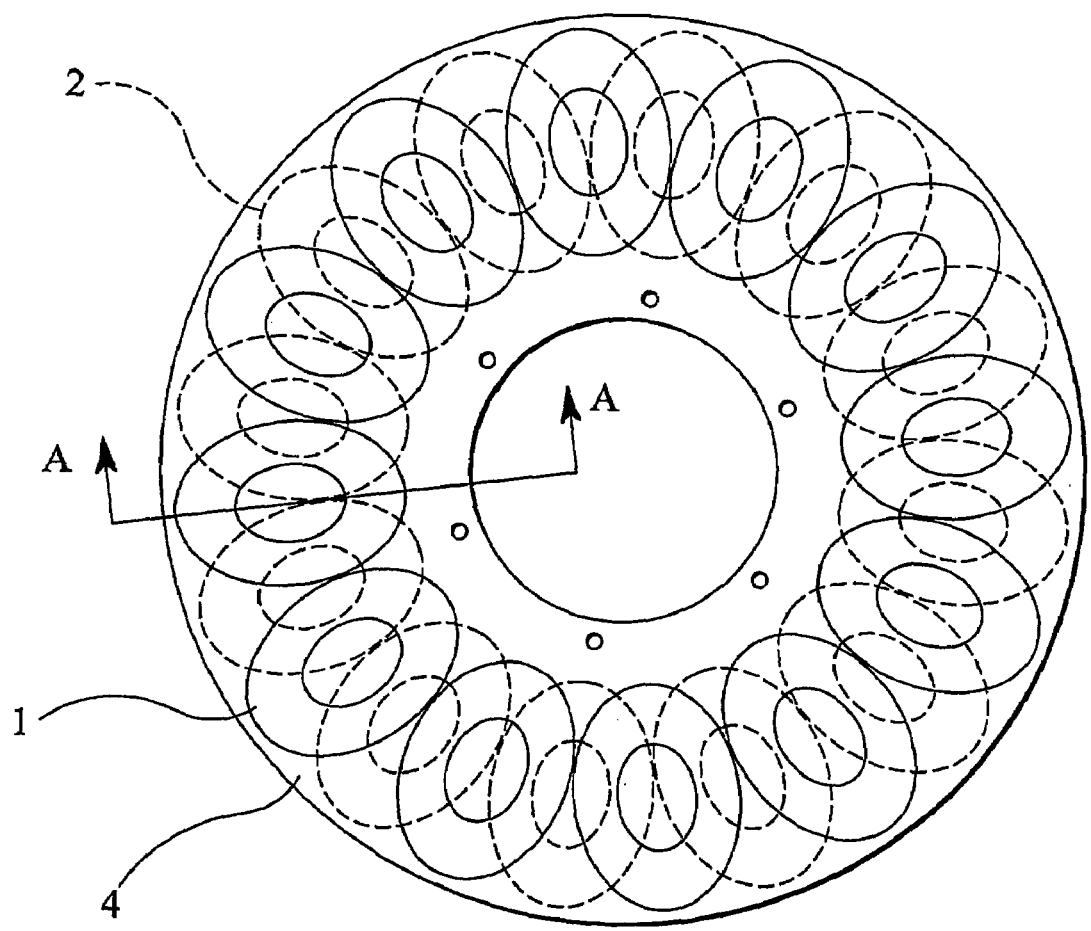
FIG. 1 is a plan view of part of a stator assembly of one embodiment of a synchronous axial field electrical machine according to the present invention.
Figure 2:
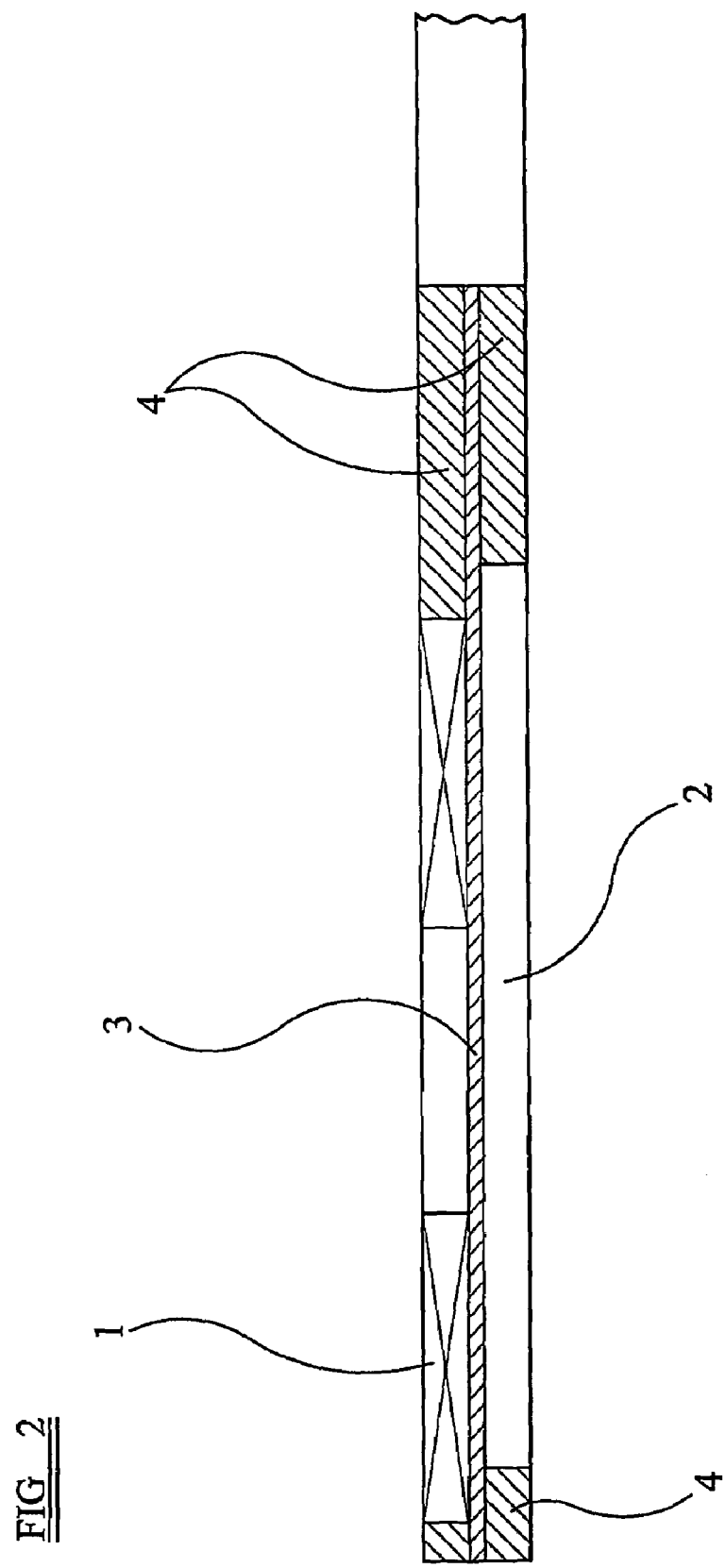
FIG. 2 is a section taken along the line A—A shown in FIG. 1.

FIGS. 1 and 2 show part of a stator assembly of an electrical generator comprising an annular body 3 of glass fibre reinforced plastics material or other suitable non-magnetic and non-electrically conducting material. Bonded to one side of the annular body 3 is a single layer of flat conductor coils 1 which are in the form of air coils of copper wire, the coils 1 being arranged substantially side-by-side in an annular configuration coaxial with the axis of the annular body 3. Bonded to the other side of the annular body 3 is a further single layer of flat conductor coils 2 which are also in the form of air coils of copper wire. The coils 2 are arranged substantially side-by-side in an annular configuration coaxial with the axis of the annular body 3 and at a radius substantially the same as the layer of coils 1. The assembly of the annular body 3 and the layers of coils 1 and 2 is embedded in a resin material 4, such as an epoxy or other plastics resin material, to form part of a stator assembly with the resin material providing location, protection and electrical insulation for the coils.

As can be seen from FIG. 1, the two layers of flat coils 1 and 2 are circumferentially offset relative to each other by an amount corresponding to half the circumferential dimension of the coils, that is by an amount corresponding substantially to the pitch of adjacent coils divided by the number of layers.

If desired, the stator assembly can be provided with thin walls at the axial faces thereof, in order to protect the coils and stiffen the stator assembly, without significantly reducing the ability of the coils to be cooled by air flow.

Figure 3:
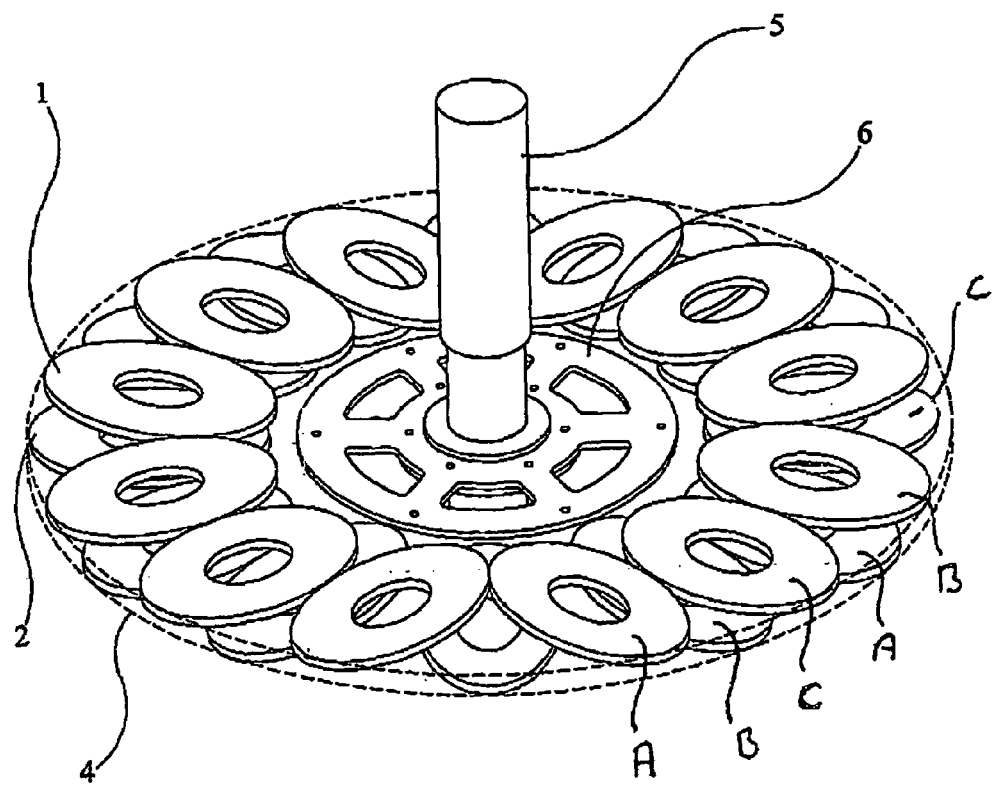
FIG. 3 is a perspective view of the stator assembly part shown in FIGS. 1 and 2 attached to a main shaft to form a stator assembly.

As can be seen from FIG. 3, the stator assembly is completed by securing the stator component of FIGS. 1 and 2 to a main shaft 5 by way of a spoked stator hub 6 which is fastened to the stator component of FIGS. 1 and 2 by suitable fastening means. The spokes of the stator hub 6 allow air to pass either side of the stator assembly for cooling purposes.

Figure 4:
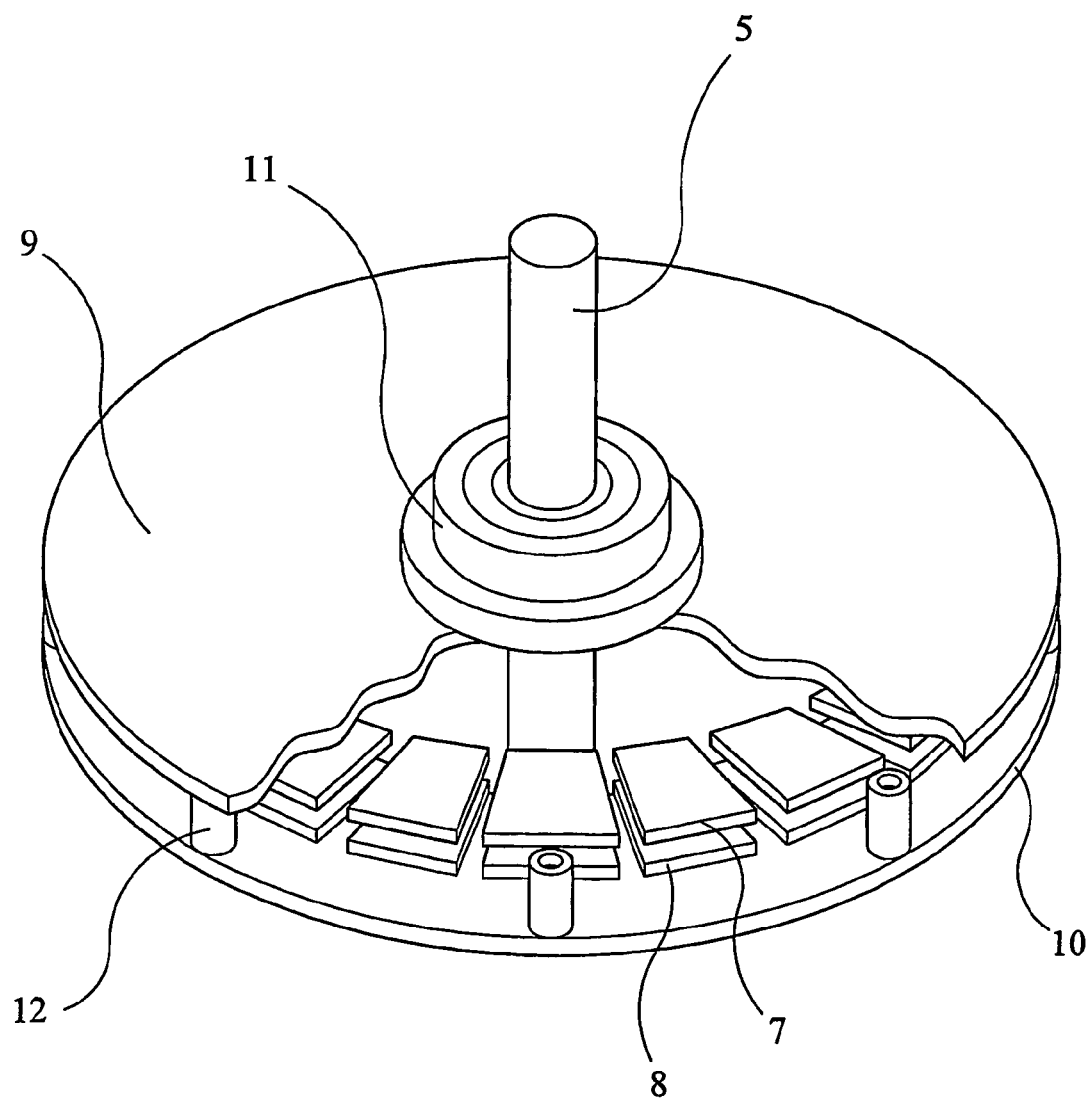
FIG. 4 is a perspective view of a rotor assembly of one embodiment of a synchronous axial field electrical machine according to the present invention in the form of a permanent magnet electrical machine, with a top plate partly cut away and the stator assembly omitted for clarity.

FIG. 4 shows a rotor assembly which comprises two parallel plates 9 and 10 which are secured together around the peripheries thereof by a plurality of spacers 12 such that the plates 9 and 10 are not rotatable relative to each other. The plates 9 and 10 are rotatably mounted about a common axis on the main shaft 5 by way of a bearing 11. The plates 9 and 10 are each made of a single piece of soft magnetic material such as mild steel.

A plurality of permanent magnets 7 are secured to the plate 9 on that face thereof facing plate 10, the magnets 7 being arranged side-by-side in an annular array coaxial with the axis of the main shaft 5 and at a radius corresponding substantially to that of the coils 1 and 2. The magnets 7 are arranged radially such that poles of opposing polarity are adjacent in adjoining magnets.

A similar plurality of permanent magnets 8 are secured to the plate 10 on that face thereof facing plate 9, the magnets 8 being arranged side-by-side in an annular array coaxial with the axis of the main shaft 5 and at a radius corresponding substantially to that of the magnets 7 and the coils 1 and 2. The magnets 8 are arranged radially such that poles of opposing polarity are adjacent in adjoining magnets and such that each magnet 8 faces a corresponding magnet 7 with poles of opposing polarity opposite each other. Thus the magnets 7 and 8 create a substantially axial magnetic field in the stator assembly.

Figure 5:
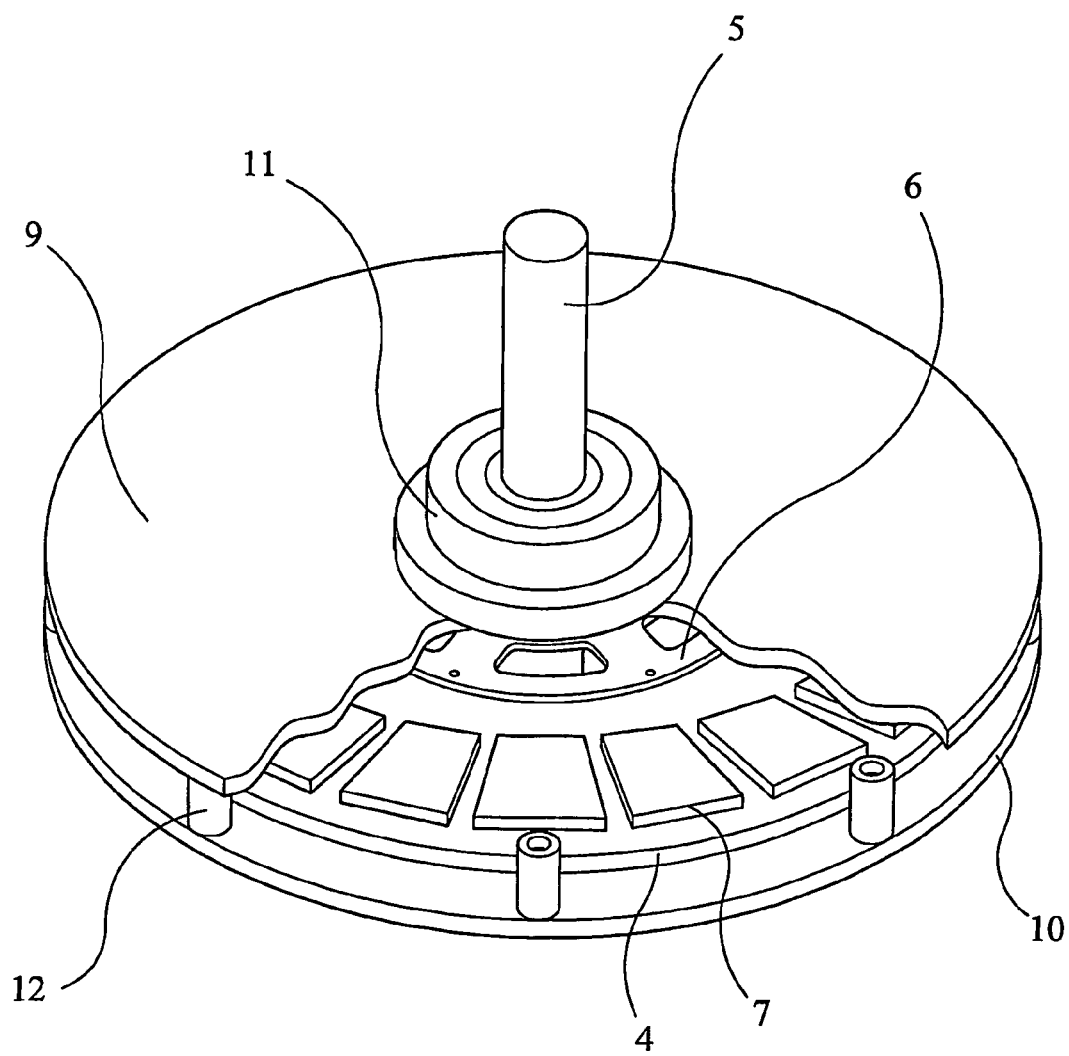
FIG. 5 is a perspective view of a synchronous axial field electrical machine according to the present invention incorporating the rotor assembly of FIG. 4 and the stator assembly of FIGS. 1 to 3, a top plate of the rotor assembly being partly cut away for clarity.

FIG. 5 shows the stator assembly of FIG. 3 positioned within the rotor assembly of FIG. 4 with the coils 1 and 2 positioned in an air gap of predetermined magnitude between the two annular arrays of magnets 7 and 8 which are secured to the plates 9 and 10.

The configuration of the coils 1 and 2 as flat coils and the position of the coils lying flat on opposing faces of the annular body 3 allows the coils to be located close to the permanent magnets 7 and 8 thus permitting the size of the air gap to be kept to a minimum, while at the same time presenting substantially the entire surface area of each coil for cooling purposes. The annular body can be as thick as may be required for dimensional stability without reducing the ability of the coils to cool by releasing heat at the exposed face thereof.

The use of a single piece of soft magnetic material for each of the plates 9 and 10, that is the plates are not laminated, has the advantage that the plates 9 and 10 are economical to produce and are sufficiently strong to support further components, such as a blade of a wind turbine. However, a unitary construction for the plates 9 and 10 gives rise to eddy current losses within the plates. The eddy current losses are in turn reduced by providing the two layers of flat coils which are circumferentially offset relative to each other by an amount corresponding to half the circumferential dimension of the coils.

The machine illustrated in FIGS. 1 to 5 is a three phase machine in which the angular separation between adjacent coils is one and one third times the angular separation between adjacent magnets (the angular separation being defined as the angle between the centres of adjacent coils or magnets, as the case may be, measured about the axis of rotation). Thus, in the illustrated embodiment there are twelve coils 1, twelve coils 2 and sixteen magnets 7 and sixteen magnets 8. The coils 1 and 2 are connected such that the phases alternate between the layers of coils. Thus, a first phase (A) may be a coil 1, a second phase (B) is then a coil 2 partly overlapping the coil 1 of the first phase, a third phase (C) is then a coil 1 adjacent to the coil 1 of the first phase and partly overlapping the coil 2 of the second phase. The pattern then continues with the first phase being a coil 2 adjacent to the coil 2 of the second phase and partly overlapping the coil 1 of the third phase, and so on.

If desired, a machine can be created generating an arbitrary number of phases by choosing the appropriate ratio of angular separation of adjacent coils to the angular separation of adjacent magnets.

The electrical machine described above and shown in FIGS. 1 to 5 can be modified in a number of ways. For example, a number of machines may be provided on a common axis, one behind the other. Further, the machine can function as a motor as an alternative to functioning as a generator. Also the permanent magnets can be replaced by electromagnets. In a further modification the magnets may be provided on the stator assembly and the coils may be provided on the rotor assembly. Moreover, a single array of magnets may be provided between two layers of coils, the coils of one layer being circumferentially offset relative to the coils of the other layer as described hereinabove.

Figure 8:
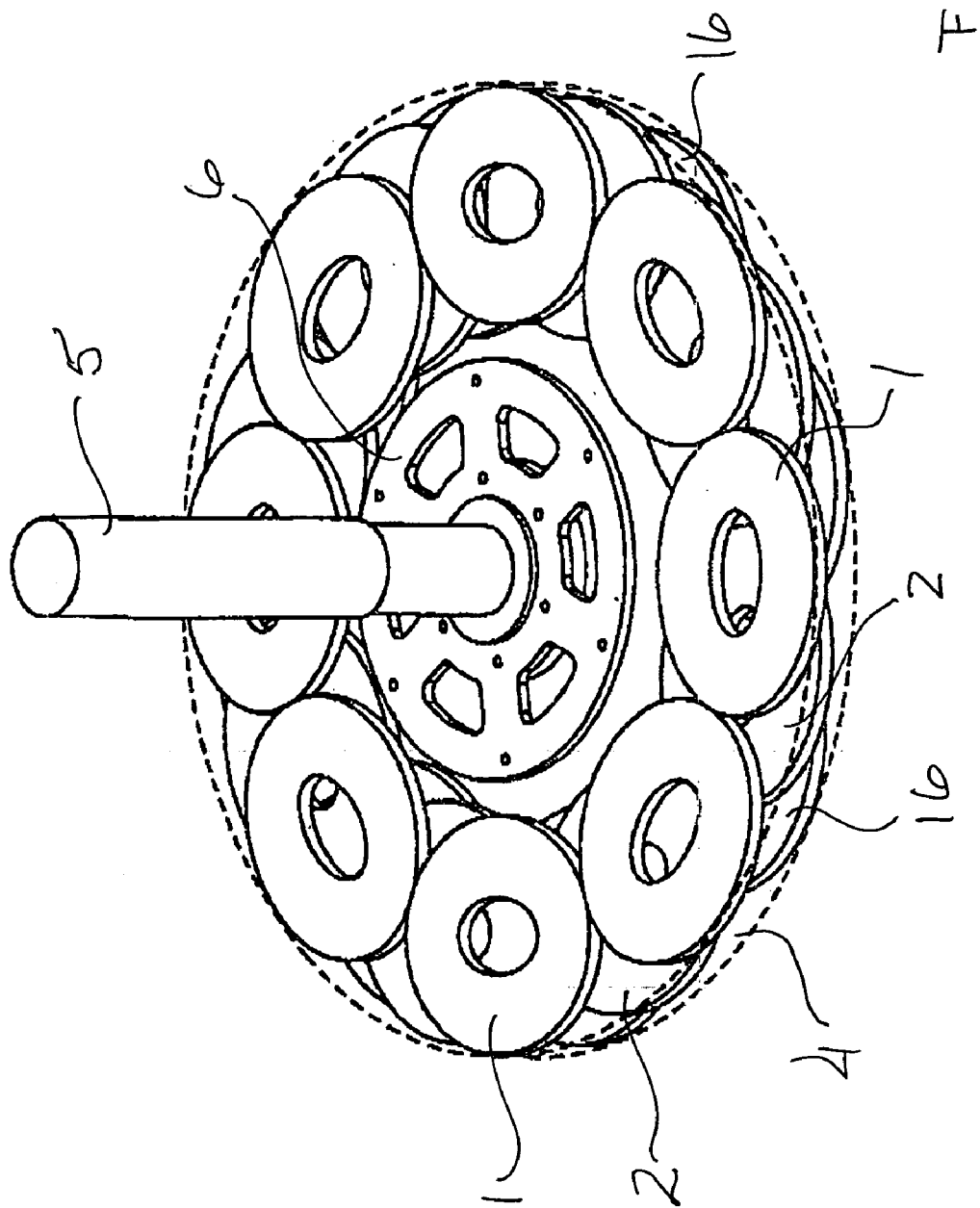
FIG. 8 is a view similar to that of FIG. 3 but including a third layer of flat conductor coils.

The number of layers of coils need not be restricted to twos and three or more layers of coils may be provided. Thus, FIG. 8 shows a stator assembly similar to that depicted in FIG. 3 but in which a third layer of coils 16 are embedded in the resin material 4. The number of phases may be chosen by appropriate selection of the number of layers of coils and the ratio of the angular separation between adjacent coils and adjacent magnets. In such a case, the machine may be a polyphase machine, that is, three or more phases. However, particularly where the machine is in the form of a generator the alternating current outputs may be rectified to provide a direct current output.

Figure 6:
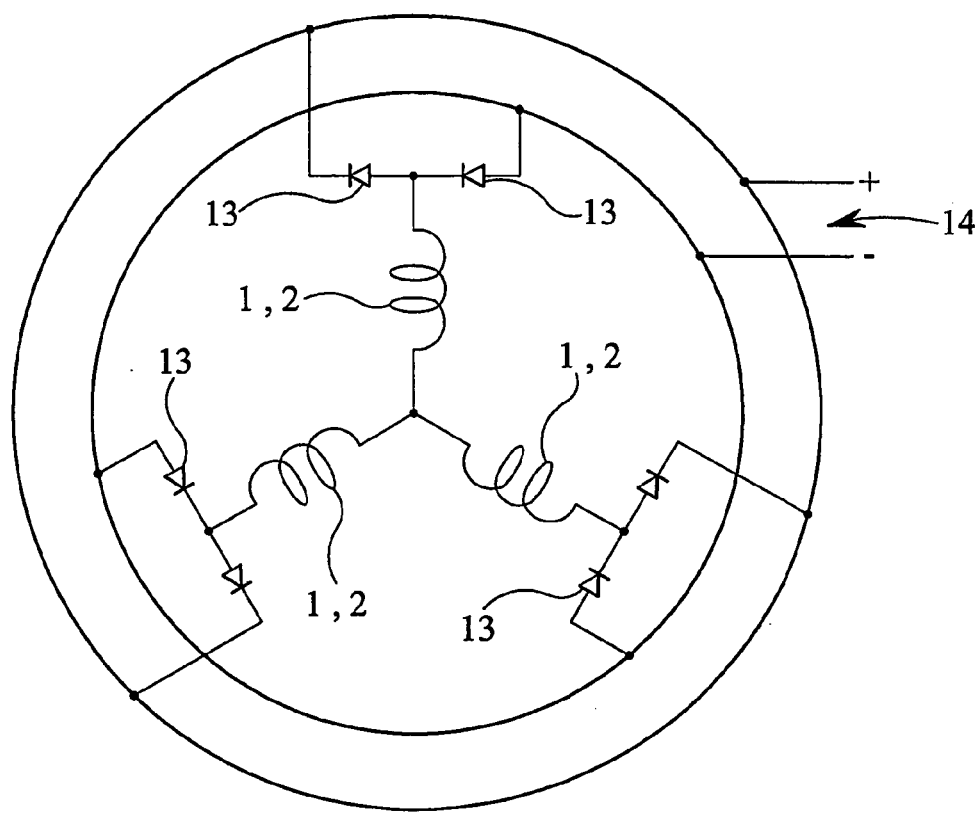
FIG. 6 is a diagrammatic illustration of one embodiment of a synchronous axial field electrical machine configured as a generator in which a polyphase output is rectified to produce a direct current output.

FIG. 6 is a diagrammatic illustration of a star configuration of generator, in this case producing three phases, although the number of phases is not important. One example of this is when the number of phases equals the number of coils. Coils 1 and 2 in the same phase may be connected in groups in series or in parallel and the alternating current output of each group is rectified with diodes 13 in order to produce a direct current output 14.

Figure 7:
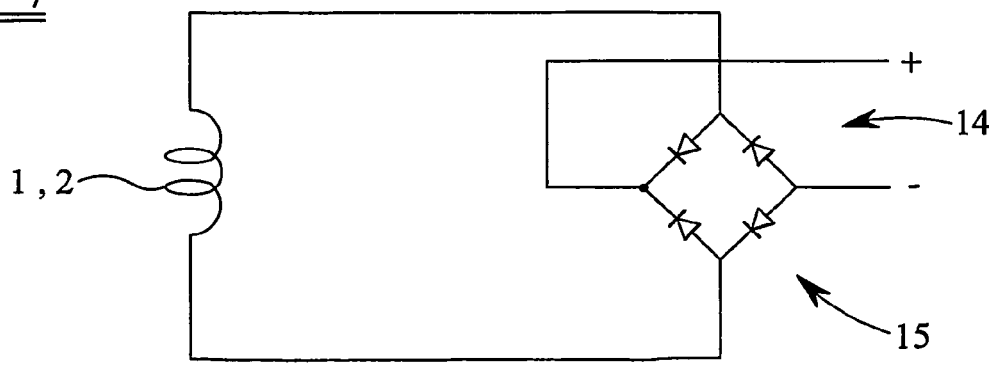
FIG. 7 is a diagrammatical illustration of another embodiment of a synchronous axial field electrical machine configured as a generator in which one output, phase is rectified to produce a direct current output.

FIG. 7 is a diagrammatic illustration where each coil 1 or 2, or group of coils of the same phase, connected in series or in parallel, is or are electrically isolated from the other coils. The alternating current output of a generator is rectified using, for example, a bridge rectifier 15 in order to produce a direct current output 14. The direct current output from multiple rectifiers may be connected together. It should be noted the arrangement of rectifiers shown in FIG. 6 may be used if desired.

The invention claimed is:

1. A synchronous axial field electrical machine comprising a first substantially planar member (9, 10) and a second substantially planar member (3) arranged substantially parallel to the first substantially planar member, the first and second members being rotatable relative to each other about a common axis substantially perpendicular to the planes of the first and second members wherein the first member (9, 10) is provided with an annular array of magnets (7, 8) coaxial with the common axis and configured to provide a substantially axial magnetic field passing through the second member and the second member is provided with a first annular array of flat coils (1) coaxial with the common axis and arranged substantially side-by-side in a first layer and with a second annular array of flat coils (2) coaxial with the common axis and arranged substantially side-by-side in a second layer, the coils (2) of the second array being offset in a circumferential direction relative to the coils (1) of the first array by an amount corresponding substantially to the pitch of adjacent coils divided by the number of layers.

2. An electrical machine as claimed in claim 1, wherein two layers of coils (1, 2) are provided, the coils (1) of one layer being offset relative to the coils (2) of the other layer by an amount corresponding substantially to half the spacing between adjacent coils.

3. An electrical machine as claimed in claim 1, wherein the magnets (7, 8) and the coils (1, 2) are disposed at substantially the same radial distance from the common axis.

4. An electrical machine as claimed in claim 1, wherein the first planar member comprises first and second coaxial plates (9, 10) which are spaced apart from each other.

5. An electrical machine as claimed in claim 4, wherein the magnets (7, 8) are provided on that face of each one of the first and second plates (9, 10) facing the other thereof.

6. An electrical machine as claimed in claim 1, wherein the first and second arrays of flat coils (1, 2) are provided on opposing sides of a support member (3).

7. A synchronous axial field electrical machine comprising a first substantially planar member (9, 10) and a second substantially planar member (3) arranged substantially parallel to the first substantially planar member, the first and second members being rotatable relative to each other about a common axis substantially perpendicular to the planes of the first and second members wherein the first member (9, 10) is provided with an annular array of magnets (7, 8) coaxial with the common axis and configured to provide a substantially axial magnetic field passing through the second member and the second member is provided with a first annular array of flat coils (1) coaxial with the common axis and arranged substantially side-by-side in a first layer and with a second annular array of flat coils (2) coaxial with the common axis and arranged substantially side-by-side in a second layer, the coils (2) of the second array being offset in a circumferential direction relative to the coils (1) of the first array, and the ratio of angular separation of adjacent coils (1, 2) in each array to the angular separation of adjacent magnets (7, 8) corresponding to the number of electrical phases.

8. An electrical machine as claimed in claim 7, wherein the magnets (7, 8) and the coils (1, 2) are disposed at substantially the same radial distance from the common axis.

9. An electrical machine as claimed in claim 7, wherein the first planar member comprises first and second coaxial plates (9, 10) which are spaced apart from each other.

10. An electrical machine as claimed in claim 9, wherein the magnets (7, 8) are provided on that face of each one of the first and second plates (9, 10) facing the other thereof.

11. An electrical machine as claimed in claim 7, wherein the first and second arrays of flat coils (1, 2) are provided on opposing sides of a support member (3).

* * * * *